(12) United States Patent
Austin et al.

(10) Patent No.: US 10,102,371 B2
(45) Date of Patent: Oct. 16, 2018

(54) COMPUTER DEVICE AND METHOD FOR ISOLATING UNTRUSTED CONTENT ON A CLIPBOARD

(71) Applicant: Avecto Limited, Manchester (GB)

(72) Inventors: Mark James Austin, Manchester (GB); Belaid Bezzaa, Manchester (GB)

(73) Assignee: AVECTO LIMITED (GB)

( * ) Notice: Subject to any disclaimer, the term of this patent is extended or adjusted under 35 U.S.C. 154(b) by 220 days.

(21) Appl. No.: 15/097,959

(22) Filed: Apr. 13, 2016

(65) Prior Publication Data

US 2016/0306964 A1  Oct. 20, 2016

(30) Foreign Application Priority Data

Apr. 14, 2015 (GB) .................................. 1506331.6

(51) Int. Cl.
*G06F 21/55* (2013.01)
*G06F 21/52* (2013.01)

(52) U.S. Cl.
CPC ............ *G06F 21/556* (2013.01); *G06F 21/52* (2013.01)

(58) Field of Classification Search
CPC ............................... G06F 21/556; G06F 21/52
See application file for complete search history.

(56) References Cited

U.S. PATENT DOCUMENTS

| 9,460,293 | B1* | 10/2016 | Kashyap | G06F 21/6281 |
| 2004/0006706 | A1* | 1/2004 | Erlingsson | G06F 21/51 |
| | | | | 726/30 |
| 2005/0149726 | A1* | 7/2005 | Joshi | G06F 21/51 |
| | | | | 713/164 |
| 2006/0117178 | A1* | 6/2006 | Miyamoto | G06F 21/556 |
| | | | | 713/165 |
| 2007/0050369 | A1* | 3/2007 | Stiegler | G06F 21/53 |
| 2010/0175104 | A1* | 7/2010 | Khalid | G06F 9/545 |
| | | | | 726/1 |
| 2014/0040638 | A1* | 2/2014 | Barton | H04L 41/00 |
| | | | | 713/193 |
| 2015/0012861 | A1* | 1/2015 | Loginov | G06F 9/543 |
| | | | | 715/770 |
| 2015/0207850 | A1* | 7/2015 | Jitkoff | H04L 67/06 |
| | | | | 715/748 |
| 2016/0019104 | A1* | 1/2016 | Major | G06F 9/543 |
| | | | | 719/319 |

FOREIGN PATENT DOCUMENTS

WO  WO 2014/110057 A1  7/2014
WO  WO 2014110057 A1 *  7/2014 ............. G06F 9/543

* cited by examiner

*Primary Examiner* — Joseph P Hirl
*Assistant Examiner* — J. Brant Murphy
(74) *Attorney, Agent, or Firm* — Knobbe, Martens, Olson and Bear, LLP

(57) ABSTRACT

A computer device and respective method provides a primary clipboard accessible from a primary user account, while a sandbox is used to isolate and contain a secondary user account. A secondary clipboard is provisioned and associated with the secondary user account. The computer device, via an agent, intercepts requests from the secondary user account such as for cut, copy or paste type clipboard operations which are ordinarily directed toward the primary clipboard, and satisfies those clipboard operation requests instead by using the secondary clipboard.

20 Claims, 16 Drawing Sheets

COMPUTER DEVICE AND METHOD FOR ISOLATING UNTRUSTED CONTENT ON A CLIPBOARD

CROSS REFERENCE TO RELATED APPLICATIONS

This application claims priority under 35 U.S.C. § 119 to United Kingdom Application No. 1506331.6, filed Apr. 14, 2015, the disclosure of which is hereby incorporated by reference herein in its entirety.

BACKGROUND

Field

The present invention relates generally to the field of computers and computer devices. More particularly, the present invention relates to a computer device and a method for isolating untrusted or malicious content on a clipboard.

Description of Related Art

There is an on-going need to protect computer devices from malicious content, as is well recognised in the field of computer security. In particular, it is desired to protect computer devices from malicious content which may be introduced by actions of a user, such as by using a clipboard.

Generally, a clipboard is a facility within the computer device which is used for short-term data storage and/or data transfer between documents or applications, via 'cut', 'copy' and 'paste' type clipboard operations. The clipboard is usually implemented as an anonymous temporary data buffer that can be accessed from most or all programs or applications via defined application programming interfaces (APIs). Typically, applications will access the clipboard facility by mapping user inputs or commands (e.g. mouse, keybindings or menu selections) to these interfaces.

As one example, the Apple 'OS X' family of operating systems provide a 'Pasteboard'. Using a Pasteboard Server, content may be transferred by accessing a shared repository where a data writer and a data reader exchange data. For example, the key binding 'Cmd-C' or 'Cmd-X' instructs a copy or cut of selected data from a source, such as a web page in a Safari Internet browser. The writer or pasteboard owner (for example, a Safari writer) deposits that data from a writer address space onto a pasteboard instance in a pasteboard address space. The key binding 'Cmd-V' then pastes content from the clipboard into a nominated destination, e.g. an Apple Pages document. The relevant reader accesses the pasteboard and retrieves the relevant clipboard content to a reader address space.

In the Microsoft Windows family of operating systems, a 'Windows Clipboard' ('WC') provides a set of API calls, messages and notifications, to enable data transfer and sharing within or between applications. For example, the key bindings 'Ctrl+C' and 'Ctrl+X' allow the user to copy or cut data from a source—such as an image from a web page in Internet Explorer or an attachment from email. In response, this data is copied by the operating system from an application memory which is associated with the source, to a globally allocated memory associated with the clipboard. Conversely, the key binding 'Ctrl+V' instructs the operating system to paste a current item of clipboard content into an identified destination—e.g. paste the image from the web page into a Microsoft Word document or insert the attachment from the email into a database. In response, the relevant clipboard content is copied by the operating system from the globally allocated memory associated with the clipboard into an appropriate application memory associated with the destination.

In more detail, when the user copies or cuts data from a user application, the following events may take place on the computing device: the clipboard is opened by initialisation, e.g. by calling a clipboard API function OpenClipboard; memory is allocated for the clipboard from a global store, e.g. by calling a memory management function GlobalAlloc; the clipboard is emptied of any previous content, e.g. by calling another clipboard API function EmptyClipboard; user-copied or user-cut data are copied from the memory associated with the user application to the globally allocated memory, e.g. by invoking a clipboard API function SetClipboardData; a handle returned by the memory allocation function and a data format of the user-copied or user-cut data are passed to the clipboard; and the clipboard is closed, e.g. by a clipboard API function CloseClipboard.

Similarly, when the user pastes data into a user application, the following events associated with the paste operation may take place on computing device: the clipboard is opened by initialisation by the user application (e.g. by calling the function OpenClipboard); available data formats (e.g. text, bitmap) of the clipboard content are retrieved by the user application; a handle to the clipboard data is obtained by the user application (e.g. using a clipboard API function GetClipboardData); a copy of the clipboard data is inserted into the user application; and the clipboard is closed by the user application (by invoking the function CloseClipboard).

In addition, each of the applications on the computer device may query the clipboard regarding a format of the data contained in the clipboard and/or may set up notification mechanisms to determine whenever the clipboard content has changed, via the clipboard API. That is, the applications may place one or more clipboard content objects on the clipboard, in which a clipboard content object represents the clipboard content in a specific data format (for example, the specific data format may be represented by a number of UINT type). For example, Microsoft Windows provides further clipboard API calls that may be invoked to obtain information regarding data formats managed by the clipboard, such as a count and a type of the data formats. Thus, the clipboard API function CountClipboardFormats may be used to retrieve a number of the data formats (for example, different data formats) currently on the clipboard; clipboard API function IsClipboardFormatAvailable may be called to determine whether the clipboard contains the clipboard content in the specific data format; clipboard API function EnumClipbaordFormats enumerates the data formats currently available on the clipboard; clipboard API function GetPriorityClipboardFormat may be called to retrieve a first available data format in a specified list; clipboard API function GetClipboardFormatName may be used to retrieve from the clipboard a name of the specific data format; clipboard API function GetUpdatedClipboardFormats may be similarly used to retrieve currently supported data formats; and clipboard API function RegisterClipboardFormat may be invoked to register a new data format.

Furthermore, the operating system may allow an application to register to be notified when the clipboard content has changed. In this way, applications may monitor the clipboard. The operating system may send messages to applications that have registered to be notified when the clipboard content has changed. For example, Microsoft Windows allows an application to add itself to a clipboard viewer chain by calling another clipboard API function SetClipboardViewer. A clipboard viewer thus will receive a clipboard content change message (WM_DRAWCLIPBOARD) whenever the clipboard content changes. The application may invoke related clipboard API function GetClipboardViewer to retrieve a handle to a first clipboard viewer in the clipboard viewer chain. Further, the application may register as a clipboard data format listener by simply calling clipboard API function AddClipboardFormatListener. When the clipboard content changes, the application is posted another clipboard content change message (WM_CLIPBOARDUPDATE). The registration remains valid until the application unregisters by calling related clipboard API function RemoveClipboardFormatListener. In addition, the application may query a clipboard sequence number of the clipboard. When the clipboard content changes, the clipboard sequence number is incremented. The application may also retrieve a current clipboard sequence number by calling clipboard API function GetClipboardSequenceNumber. Hence, by comparing the current clipboard sequence number with a previous clipboard sequence number, the application may determine whether the clipboard content has changed. Further, the application may also retrieve a window handle of a current owner of the clipboard by calling clipboard API function GetClipboardOwner. Additionally, the application may obtain a handle to another application that currently has the clipboard open by calling clipboard API function GetOpenClipboardWindow.

A challenge arises in that malicious code (malware) may attempt to access a clipboard on the computer device for malicious purposes, such as to obtain sensitive information or to corrupt the content stored therein. The clipboard is normally user-driven, such that the application should transfer data to or from the clipboard only in response to interaction from the user. However, malicious software may access the clipboard without requiring any user interaction. In practice, malware may access the clipboard through relevant calling functions (e.g. through the clipboard API as described above) without requiring any user interaction. Further, malicious software may access the clipboard through deliberate or non-deliberate user interaction. For example, untrusted content may be copied by the user from an untrusted source (e.g. untrusted content, untrusted application) and pasted into a trusted destination (e.g. trusted content, trusted application) thus introducing a vector of attack into the previously trustworthy destination.

Considering these example arrangements for providing the clipboard, it will be appreciated that malware may relatively easily register to be notified when contents of the clipboard have changed, may query the clipboard sequence number, may retrieve a window handle of a current owner of the clipboard, may obtain a handle to a window that currently has the clipboard, may obtain a handle to the clipboard data, or may copy data to or from the clipboard. Any one of these actions may provide an opportunity to perform malicious acts on the computer device.

In the related art, it is known to isolate untrusted content by limiting the resources of the computer device which are accessible by the untrusted content. A difficulty arises in that many of the current mechanisms for content isolation are relatively insecure, in that they still allow malicious content to reach important resources of the computer device. Also, many known implementations of content isolation are relatively resource intensive, such as by needing a relatively large amount of memory, disc space or computer processing power.

As a further difficulty, content isolation often requires a relatively skilled and knowledgeable user of the computer device. Therefore, it is quite difficult for an ordinary user to implement content isolation in a way which is safe, effective and reliable, yet also simple and intuitive. In some cases, content may need to be adapted in advance for the purposes of isolation, by being specifically prepared in a manner capable of being isolated, which increases costs and makes content isolation less likely to be implemented in practice.

The example embodiments have been provided with a view to addressing at least some of the difficulties that are encountered in current computer devices and computer networks, whether those difficulties have been specifically mentioned above or will otherwise be appreciated from the discussion herein.

SUMMARY

According to the present invention there is provided a computer device, a method and a computer-readable storage medium as set forth in the appended claims. Other, optional, features of the invention will be apparent from the dependent claims, and the description which follows.

There now follows a summary of various aspects and advantages according to embodiments of the invention. This summary is provided as an introduction to assist those skilled in the art to more rapidly assimilate the detailed discussion herein and is not intended in any way to limit the scope of the claims that are appended hereto.

In one example a computer device and respective method are described which provide a primary clipboard accessible from a primary user account, while a secondary user account is isolated within a sandbox. A secondary clipboard is provisioned and associated with the secondary user account. The computer device, e.g. via an agent, intercepts requests from the secondary user account such as for cut, copy or paste type clipboard operations which are ordinarily directed toward the primary clipboard, and satisfies those clipboard operation requests instead by using the secondary clipboard.

In one example there is described a computer device which isolates untrusted content on the computer device, in which the computer device includes a processor and a memory. The computer device is configured to provide a primary clipboard accessible from a primary user account, wherein the primary clipboard enables content to be temporarily stored therein and retrieved therefrom. The computer device is further configured to programmatically create a secondary user account derived from the primary user account and which isolates an untrusted process therein and to provision a secondary clipboard associated with the secondary user account. Furthermore, the computer device is configured intercept a clipboard operation request from the secondary user account for a cut, copy or paste type clipboard operation request which is directed toward the primary clipboard and to satisfy the clipboard operation request using the secondary clipboard associated with the secondary user account.

In one example, the computer device is further configured to provision the secondary clipboard in response to intercepting the clipboard operation request.

In one example, the computer device is further configured to selectively determine to permit or deny the clipboard operation request from the secondary user account.

In one example, the computer device is further configured to share an item of clipboard content between the primary clipboard and the secondary clipboard.

In one example, the computer device is further configured to selectively determine to permit or deny sharing of the clipboard content between the primary clipboard and the secondary clipboard.

In one example, the computer device is further configured to modify an item of clipboard content which is taken from the secondary clipboard and to provide a modified clipboard content item onto the primary clipboard.

In one example, the computer device is further configured to determine whether to modify a content shared between the primary clipboard and the secondary clipboard associated with the secondary user account derived from the primary user account and which isolates the untrusted process therein.

In one example, the computer device further comprises an agent module, wherein the agent module is configured to provision the secondary clipboard associated with the secondary user account, intercept the request from the secondary user account which is directed toward the primary clipboard; and satisfy the request using the secondary clipboard.

In one example, the agent module is further configured to provision a secondary window station object comprising the secondary clipboard associated with the secondary user account.

In one example, the agent module is further configured to control the computer device to switch between a primary workstation object comprising the primary clipboard associated with the primary user account and the secondary window station object comprising the secondary clipboard associated with the secondary user account.

In one example, there is described a method for isolating untrusted content on a computer device, the method being implemented by hardware of the computer device including at least a processor and a memory. The method includes: providing a primary clipboard accessible from a primary user account, wherein the primary clipboard enables content to be temporarily stored therein and retrieved therefrom; creating programmatically a secondary user account derived from the primary user account and which isolates an untrusted process therein; provisioning a secondary clipboard associated with the secondary user account derived from the primary user account and which isolates an untrusted process therein; intercepting a request from the secondary user account derived from the primary user account and which isolates an untrusted process therein which is directed toward the primary clipboard; and satisfying the request using the secondary clipboard associated with the secondary user account derived from the primary user account and which isolates the untrusted process therein.

In one example, the step of provisioning the secondary clipboard comprises provisioning the secondary clipboard in response to intercepting the clipboard operation request.

In one example, the method further comprises selectively determining to permit or deny the clipboard operation request from the secondary user account.

In one example, the method further comprises sharing an item of clipboard content between the primary clipboard and the secondary clipboard.

In one example, the method further comprises selectively determining to permit or deny sharing of the clipboard content between the primary clipboard and the secondary clipboard.

In one example, the method further comprises modifying an item of clipboard content which is taken from the secondary clipboard and providing a modified clipboard content item onto the primary clipboard.

In one example, the method further comprises determining whether to modify a content shared between the primary clipboard and the secondary clipboard associated with the secondary user account derived from the primary user account and which isolates the untrusted process therein.

In one example, the step of provisioning the secondary clipboard comprises provisioning a secondary window station object comprising the secondary clipboard associated with the secondary user account.

In one example, the method further comprises switching between a primary workstation object comprising the primary clipboard associated with the primary user account and the secondary window station object comprising the secondary clipboard associated with the secondary user account.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

At least some of the following example embodiments provide an improved mechanism for isolating untrusted content on a clipboard in a computer device. Advantageously, the example embodiments leverage inherent security of an existing security model to provide a mechanism for content isolation using isolation environments. Many other advantages and improvements will be discussed in more detail herein.

Firstly, the concept of an isolation environment (or sandbox) will be discussed and explained in detail below with reference to FIGS. 1-6. Secondly, an example mechanism for securely isolating a clipboard will be discussed with reference to FIGS. 7-16.

Many operating systems apply a security model wherein access privileges are based on a user account. The operating system may define privilege levels appropriate to different classes, or groups, of users, and then apply the privileges of a relevant class or group to the particular logged-in user (e.g. ordinary user, super-user, local administrator, system administrator and so on). The user is authenticated by logging in to the computer device, and the user, via their previously prepared security account, acts as a security principal in the security model. The operating system of the computer device then grants appropriate privileges to processes which execute in that user's security context.

In practice, there is a widespread tendency to grant additional privilege rights, such as a local administrator level, or a system administrator level, to all members of a relevant user group, and thus allow access to almost all of the resources of the computer device. This level of access may be greater than is desirable or appropriate from a security viewpoint. For example, there is the possibility of accidental tampering with the computer device, leading to errors or corruption within the device. Further, a particular process (e.g. an infection or malware) may maliciously access key resources of the computer device with the deliberate intention of subverting security or causing damage.

Figure 1:
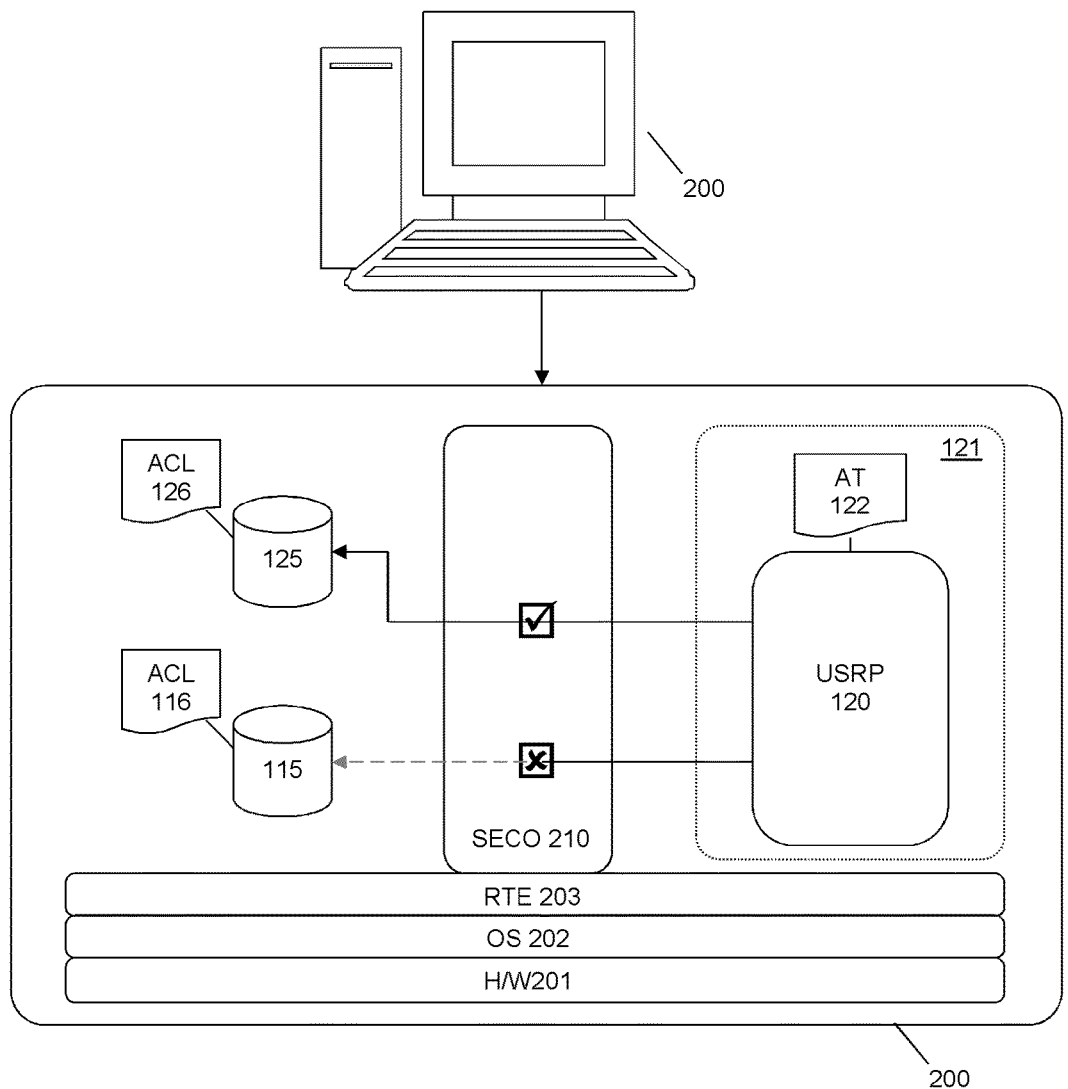
FIG. 1 is a schematic view of an example computer device.

FIG. 1 is a schematic overview of the computer device 200. The computer device 200 is configured to authenticate a user by an appropriate login procedure. For example, the user may log in to the computer device 200 with a user identity and password, and their user credentials may be validated locally or via a remote service such as a domain controller (e.g. an Active Directory domain controller).

Generally, the computer device 200 includes physical hardware (HW) 201 such as memory, processors (CPUs), I/O interfaces, backbone, power supply and so on. In use, the hardware 201 supports an operating system (OS) 202 that provides a multitude of components, modules and units that together coordinate to provide a runtime environment (RTE) 203. The runtime environment 203 in turn supports execution of a plurality of processes (USRP) 120. The example computer device 200 may further include a plurality of resources 115, 125. These resources 115, 125 are the components of the computer device that the plurality of processes 120 may rely upon in order to carry out their execution. For example, the resources 115, 125 may include installed software, system services, drivers, files and/or registry settings.

The example embodiments of the present invention will be discussed in detail in relation to computers and computer devices using the Windows™ family of operating systems provided by Microsoft Corporation of Redmond, Wash., USA. However, the teachings, principles and techniques of the present invention are also applicable in other example embodiments. For example, the example embodiments are also applicable to other operating systems, such as UNIX, Linux, and Apple 'OS X' type operating systems. In particular, the described examples are useful in many computer devices having a security model which employs discretionary access control.

As shown in FIG. 1, the operating system 202 may include a security module (SECO) 210 which is provided to enforce security within the computer device 200. As one example, the security module 210 is provided by the Windows operating system as supplied by under the trade marks Windows NT, Windows 2000, Windows XP, Windows Vista, Windows Server 2003, Windows Server 2008, Windows 7, Windows 8, and Windows 10, amongst others. The security module 210, which is also termed a security sub-system or security manager, suitably enacts the Windows security model as described, for example, in "*Windows Security Overview*" published 10 Jun. 2011 by Microsoft Corporation.

Generally, each process 120 that is initiated for a particular user will be run in a security context 121 that derives access rights and permissions from the user's security account. To this end, each process 120 is provided with an access token (AT) 122. The access token 122 typically carries a security identity (SID) of the user and SIDs of any other security groups to which the user belongs. The access token 122 thus defines the privileges as held on this computer 200 by the user and their relevant security groups.

In one example, the security module 210 is arranged to perform an access check when a process 120 requests access to any of the resource 115, 125. The security module 210 performs the access check by comparing the access token 122 of the process 120 against a security descriptor, such as an access control list (ACL) 116, 126, associated with the relevant resource 115, 125. Here, the access control list 116, 126 is suitably a Discretionary Access Control List (DACL) which identifies SIDs of users and groups that are allowed, or denied, various types of access (read, write, etc.) as appropriate for that resource.

In FIG. 1, the security module (SECO) 210 in the operating system 202 is arranged to control access by the process 120 to the resources 115, 125, according to the respective access control list 116, 126. For example, a particular process 120 is able to read from, but not write to, a file of the first resource 115. Typically, the defined access types will depend upon the type of resource being accessed. For example, storage is typically defined by read and write access rights, while a process may have terminate access rights which determine whether or not a request to terminate that process will be actioned by the operating system 202. As noted above, the user-level security context 121 is based on the user as the security principal and the access token 122 is set accordingly. Suitably, in a system which adopts the least-privilege access model, the user-level security context 121 is deliberately restricted to a minimal set of access rights as a default, original privilege level.

Figure 2:
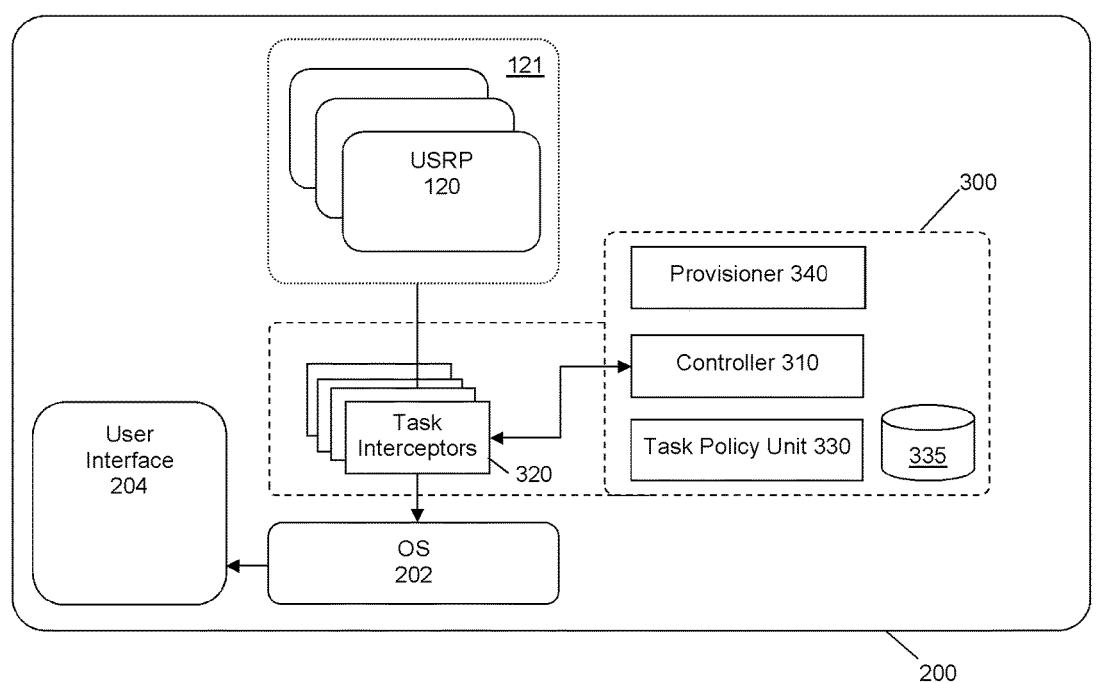
FIG. 2 is a more detailed schematic view of the example computer device.

FIG. 2 is a further schematic view of the computer device, including an example mechanism for isolating untrusted content. In one example, the mechanism applies task isolation functions in the computer device. The example mechanism is simple and convenient for the user, and is lightweight to implement. Further, the example embodiments are more secure than many other practical implementations.

FIG. 2 shows one or more user processes 120 that are currently executing in a corresponding user security context 121. The operating system 202 suitably provides a user interface component 204 which provides physical interactions with the user, including providing outputs to the user (e.g. by providing a graphical user interface (GUI) on the display screen) and receiving inputs from the user (e.g. via keyboard, mouse or other input devices). The user inputs received through the user interface 204 cause the user processes 120 to perform tasks. Typically, each task requires the user processes 120 to interact with relevant components of the operating system 202, most often via the operating system security module 210 described before.

In a windowed operating system (such as Microsoft Windows™), the user interface 204 may interact with the user via one or more window station objects. In the operating system, the window station object is a securable object responsible for displaying the user interface and receiving the user inputs. This window station object contains, amongst other things, one or more desktop objects, as will be familiar to the skilled person, which control the user's desktop interface. While some operating systems may provide more that one window station object, only a primary window station object may display the user interface or receive the user inputs. This Window Station Object or 'WSO' is typically named 'winsta0' within a Microsoft Windows environment.

These user interactions may cause the computer device 200 to perform tasks, at least some of which may be defined in advance as being 'untrusted' tasks. For example, untrusted tasks may include certain forms of Web browsing, viewing email attachments, starting an untrusted application program, or accessing a particular file in a storage medium. Generally, the untrusted tasks may involve non-executable content (data) and/or may include executable content (code) which, at least initially, is not trusted. In the example embodiments, there is a need to isolate these untrusted tasks, so that these tasks are inhibited from interfering with other tasks or components of the computer device. Isolation is advantageous to inhibit interference, whether caused intentionally or unintentionally. Notably, 'untrusted' does not mean that the respective task is necessarily malicious. Instead, the untrusted task simply has the possibility of introducing undesired effects and, at least initially, it is desired to isolate the untrusted task away from most of the other resources or components of the computer device.

Often, as a practical example, there may be a need to open untrusted content within an already trusted application. For instance, an untrusted PDF document can be opened and viewed in a trusted document reader application (e.g. Adobe Acrobat Reader). A trusted Web browser (e.g. Internet Explorer) may be instructed by the user to view an untrusted website. Hence, there is an advantage in being able to isolate the trusted applications, at least temporarily, while untrusted content is being manipulated.

As shown in FIG. 2, in one example a content isolation agent 300 is provided to protect the computer device 200 from malicious attacks by untrusted content. In one example the content isolation agent 300 may be configured as software which executes using the underlying hardware 201. In the illustrated example the content isolation agent 300 is shown installed on the computer device 200, and suitably operates in close association with the native operating system 202. In one example, the content isolation agent 300 may operate alongside the operating system 202 and is installed on the computer device 200 in addition to a commodity operating system 202. In another example, the functions of the content isolation agent 300 may be integrated within the operating system 202, e.g. by releasing an adapted or modified form of the operating system 202. In this example, the content isolation agent 300 includes a controller unit 310, one or more task interceptor units 320, a task policy unit 330 and a provisioner unit 340. These units 310-340 suitably represent functional components within the agent 300 as will be appreciated from the discussion herein.

The task interceptor units 320 are each arranged to intercept one or more respective tasks, when those tasks are instructed by the user processes 120. In one example, each task interceptor unit 320 is arranged to intercept certain tasks prior to implementation of those tasks by an intended target component within the operating system 202. Further, the interceptor units 320 may obtain task metadata concerning the intercepted task, and communicate that task metadata to the controller 310.

The policy unit 330 is configured to store policies relating to the intercepted tasks, suitably in a policy database 335 (e.g. recorded on a non-transient storage medium). The policy unit 330 interrogates the policy database 335 based on the provided task metadata and returns a policy result to the controller 310.

The controller 310 is configured to intervene selectively in relation to an intercepted task. The controller 310 may, for example, decide to block (deny) the requested task, allow the requested task to continue natively to reach an intended target in the operating system, or to isolate an untrusted task using an isolation environment. In one example, content isolation can be implemented multiple times simultaneously on the same computer device, i.e. multiple items of untrusted content may each be given their own isolation environment simultaneously.

In practice, many of the tasks which are instructed by the user processes 120 may proceed normally toward the intended target with minimal intervention, because these tasks do not relate to untrusted content. That is, the task interceptor units 320 will not interfere with a task which, e.g. by its type or nature, is not of interest to the agent 300, and may allow those tasks to proceed directly to the relevant target within the operating system 202. However, where a task is identified as potentially relating to untrusted content, then the task is intercepted and the controller 310 now has the opportunity to review the task using the policy unit 330 and to selectively intervene based on the obtained policy result. Suitably, the policies set with respect to the computer device 200 are capable of being adapted with any desired level of granularity. The policies within the policy unit 330 may be tailored appropriate to individual devices or individual users, if desired.

Figure 3:
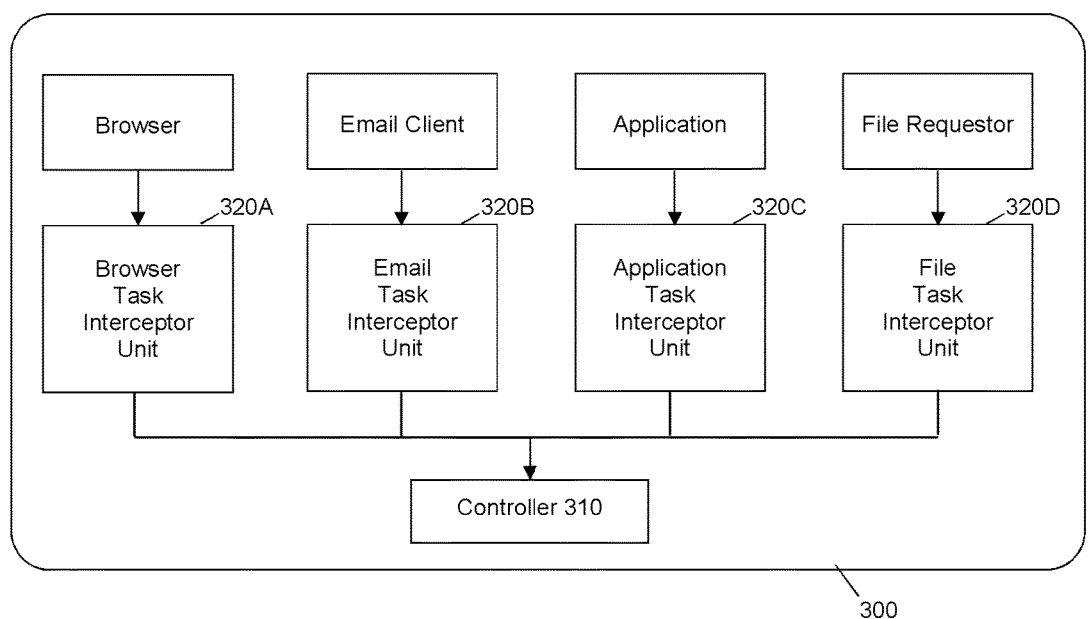
FIG. 3 is a further schematic view of the example computer device.

FIG. 3 is a schematic view of the task interceptor units 320 in more detail. In one example embodiment, the task interceptors 320 may include at least a browser task interceptor unit 320A, an email task interceptor unit 320B, an application task interceptor unit 320C, and a data file task interceptor unit 320D, amongst others.

The browser task interceptor unit 320A may include registering a plugin with a browser application. In one example, the plugin may be a browser helper object (BHO) plugin. This plugin notifies the respective task interceptor unit 320 of each web page that is requested by the user using the browser, prior to the web page being fetched by the browser application. The interceptor unit thus obtains task metadata about the respective task, in this case metadata about the requested web page about to be fetched, and passes this task metadata to the controller 310.

The email task interceptor unit 320B may be implemented as an add-on or plugin to an email client application, such as Outlook. In particular, the add-on or plugin may receive 'save to disc' notifications whenever the email client attempts to access data files on the disc. The task interceptor unit 320 may receive task metadata, which in this example concerns the data file to be accessed, the email which requested the access, and so on. The interceptor unit thus obtains task metadata about the respective task, in this case being metadata about the requested file access, and passes this task metadata to the controller 310.

The application task interceptor unit 320C may hook certain process and thread generation functions within the operating system, such as a 'CreateProcessInternal' function which creates a new process and its primary thread. This process creation function is called when starting a new application program. The interceptor unit thus obtains appropriate task metadata, in this case information about the intended application to be opened, and passes this metadata to the controller 310.

The file interceptor unit 320D may intercept tasks relevant to opening a stored file (i.e. tasks performed by the computer device in response to double-clicking a file in a file explorer process). The interceptor unit thus obtains the task metadata, in this case information about the intended data file to be opened, and passes this metadata to the controller 310.

Notably, a particular first example of the computer device 200 may have one particular first set of task interceptor units 320. Meanwhile, a second example computer device 200 may have a differing set of the task interceptors 320. Thus, the nature and type of the task interceptors 320 installed on the computer device may vary for each device.

Figure 4:
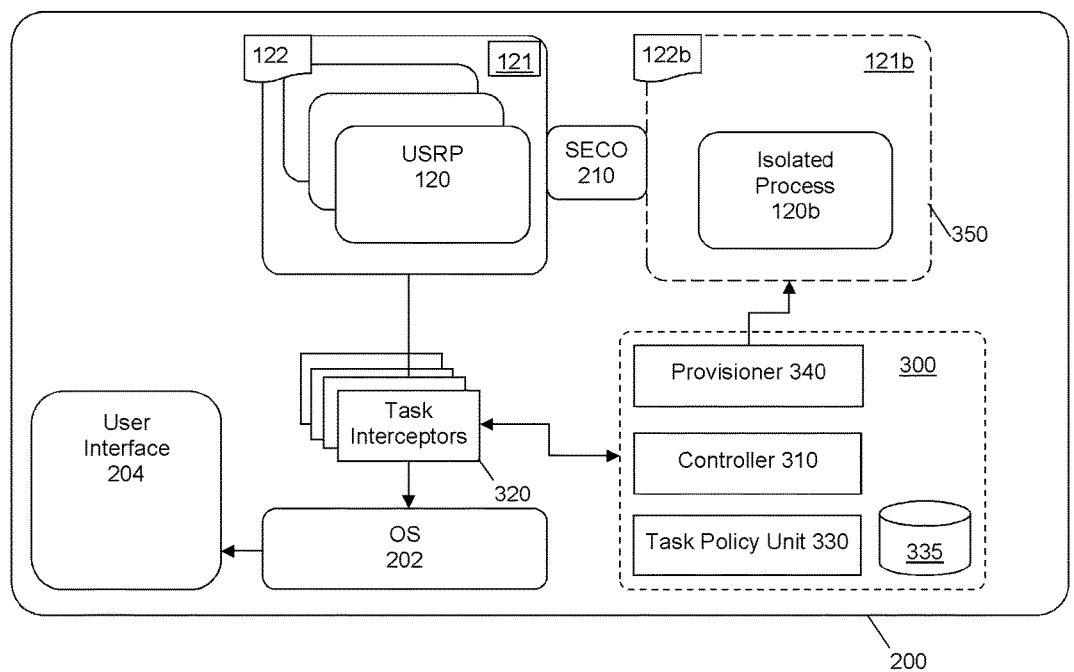
FIG. 4 is a further schematic view of the example computer device.

FIG. 4 is a schematic view of the computer device 200 with the content isolation agent 300 in operation.

Where the controller 310 determines that the task in question relates to untrusted content, i.e. is determined to be an untrusted task, then the controller 310 causes the untrusted task to be opened in a task isolation environment or sandbox 350. The controller 310 may cause a task isolation environment 350 to be provisioned. The isolation environment 350 may be configured based on configuration settings provided by the policy unit 330. Suitably, the policy unit 330 stores policies relevant to each identifiable task which is capable of being intercepted by the task interceptor units 320. Thus, the computer device 200 is capable of implementing different types of task isolation environments, each having different configurations, based on the policy settings.

Where a new task isolation environment is required, then such a task isolation environment 350 is provisioned by the controller 310, suitably by instructing the provisioner unit 340. The provisioner unit 340 provisions the new task isolation environment 350 by programmatically creating user credentials for a new user account 121b on the computer device 200, and presenting those created user credentials to the operating system 202. Suitably, the new user account 121b is a temporary user account with a programmatically created password set by the provisioner 340. For example, the provisioner 340 may generate the password as a random or pseudo-random character string. The content isolation agent 300 automatically provides these user credentials to generate the temporary user account 121b. Thus, the computer device 200 now contains the original user account 121 of the original logged in user, as a first user account or primary user account. The device also now contains a second user account 121b, namely the temporary user account or secondary user account, which has been programmatically created by the provisioner 340. The temporary user account 121b has a corresponding access token 122b, created by logging on with the credentials of the temporary user account 121b as just created. The task isolation environment 350 thus includes the temporary user account 121b in which tasks may be executed safely and in isolation from protected resources of the computer system 200, as will be discussed in more detail below.

In one example, the access token 122b of the temporary user account 121b is granted rights to the desktop user interface 204 (e.g. via a window station object) of the logged in user account 121, enabling untrusted tasks running under the temporary user account 121b to be displayed on the same desktop of the current user 121. The isolated tasks 120b in the task isolation environment 350 may be displayed simultaneously with trusted tasks 120 which are already being executed, or which are to be executed later, by this logged on user account 121.

In one example, the controller 310 launches the intercepted task now inside the task isolation environment 350 provided by the temporary user account 121b. Thus, the untrusted task launches processes 120b which are associated with the access token 122b of the temporary user account 121b. Notably, the security module 210 of the operating system 202, which is conveniently native to the computer system 200, now is leveraged to isolate this untrusted task away from content of the main user account 121.

By default, the isolation environment 121b provided by the temporary user account 121b will not enjoy access to the profile and data of the logged in user account 121, and vice versa. Further, the temporary user account 121b is suitably given minimal standard privileges, i.e. without administrative access, and is isolated from resources of the operating system 202.

The untrusted task now runs in this temporary user account 121b and accesses the profile of the temporary user for both data access and registry access. Any malicious activity only affects the temporary user account 121b and does not affect the primary user account 121.

In one example embodiment, the temporary user account 121b is non-persistent. The temporary user account 121b may be completely deleted after use. That is, the controller 310 may determine that the temporary user account 121b is no longer needed, and may delete the temporary user account 121b from the computer device 200, thus removing all traces of the untrusted task and untrusted content. When the user wishes to repeat the untrusted task again, associated with the untrusted content, again a new task isolation environment is provisioned as discussed herein and the task is run within that new task isolation environment.

In another example embodiment, the task isolation environment 350 may be persistent between sessions. That is, the controller 310 may choose to maintain a particular isolation environment 350 over one or more sessions, thus providing continuity for the user for a relevant task. In one example, a session is started by the real user logging in to the computer device, and concluded by the user logging out.

Figure 5:
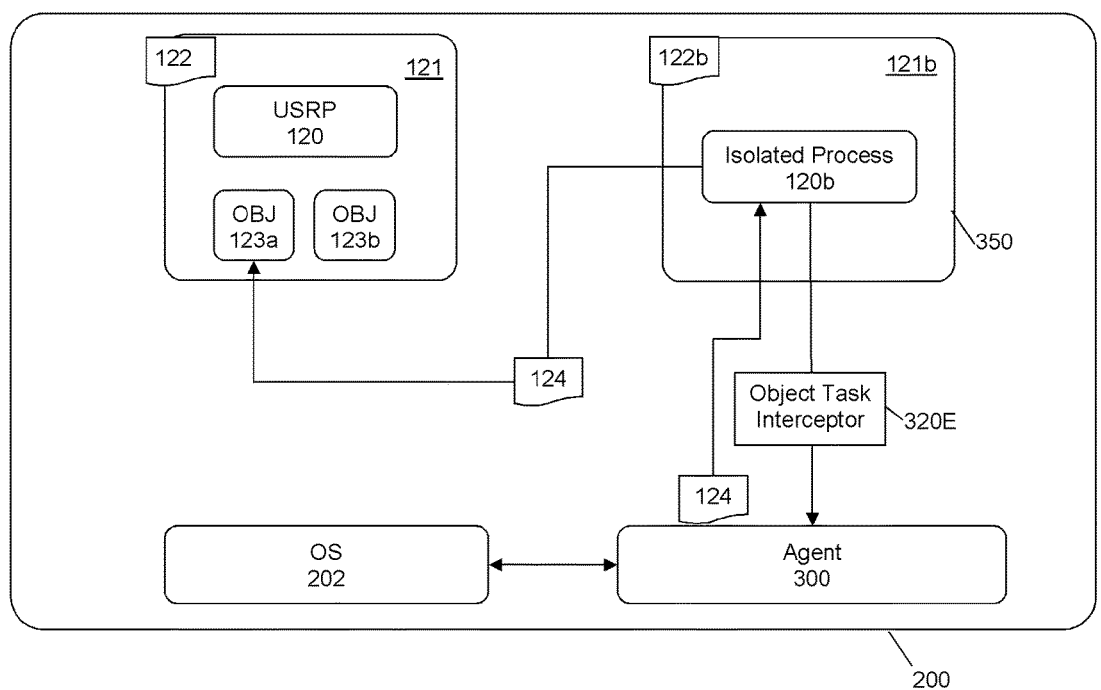
FIG. 5 is a further schematic view of the example computer device.

FIG. 5 is a further schematic view of the computer device. As shown in FIG. 5, the primary user account 121 may be associated with one or more named objects 123a, 123b. In this example, a difficulty arises in that an application executing in the isolation environment 350 is unable to access the named objects 123a, 123b which are associated instead with the primary user account 121.

In many operating systems, such as Windows, named objects are used for inter-process communication and synchronization. Typical objects include events, semaphores, mutexes, waitable timers and file-mapping (sections). Each process in a particular user session (i.e. with the same Terminal Service session id) creates or opens named objects in a namespace of the user session. This user session namespace is secured with the user's logon SID. As described above, a process 120b running in an isolation environment 350 shares the session id of the primary user account 121, but will have a different logon SID, and therefore by default does not have access to the namespace of the primary user account 121.

To provide access for the isolated processes 120b to the user session namespace, each operation to open or create a named object (i.e. an object create or an object open operation) is intercepted, by an appropriate task interceptor 320E, and an access request message is sent to the agent 300. Notably, the task interceptor 320E is provided in relation to the isolation environment 350, but otherwise may be similar to the task interceptors 320A-D discussed above. The agent 300 checks the policy rules (for example via the policy unit 330 discussed herein) to ensure that access to the requested object 123a is allowed and, if granted, the agent 300 replies to the requesting process 120b with an impersonation token 124 that has access to the relevant namespace. The thread of this isolated process 120b then calls the respective 'create' or 'open' operation using the security context now provided by the impersonation token 124. In this example, the impersonation token 124 is discarded after the create/open operation and the thread reverts back to its original security context 121b. As a consequence, only a resultant handle has access to the object, therefore preventing escalated access by that process 120b to other objects within the session namespace of the primary user.

Figure 6:
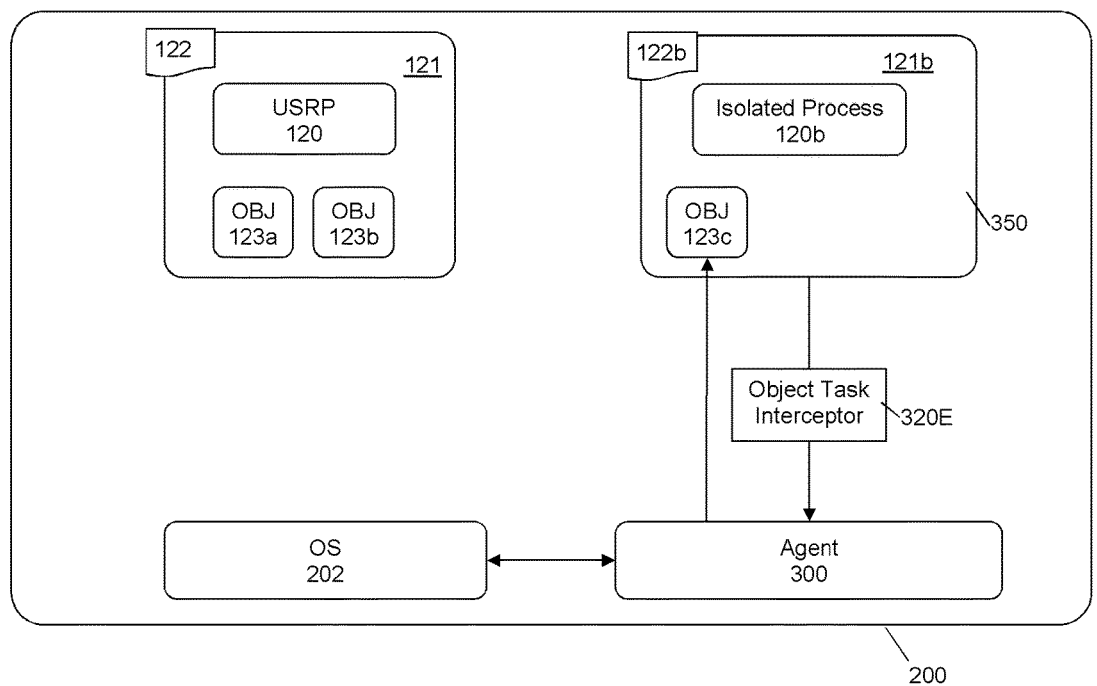
FIG. 6 is a further schematic view of the example computer device.

FIG. 6 is a further schematic view of the computer device in operation. In this example, the process 120b in the isolation environment 350 desires to create a named object 123c, which will then exist within the isolation environment. In this situation, a name of the object 123c is virtualized by the agent 300, to ensure that the name of this object does not conflict with a named object 123a in the session of the primary user having the same original object name. In more detail, a 'create object' request made by the isolated process 120b is intercepted by the agent 300 (e.g. by providing an appropriate task interceptor 320E in the isolation environment 350). The name of the requested object is amended by the agent 300 and the agent 300 replies to the requesting process 120b with the modified name for the object 123c. For example, the name of the object is modified by prepending or appending additional elements, such as the SID of the isolation environment 350. The thread of this isolated process 120b then continues with the call to the operating system 202 to create the object with the modified name provided by the agent 300, thus creating the desired named object 123c in the isolation environment 350.

When the isolated process 120b opens a desired object, the 'open' operation is intercepted by the task interceptor 320E and the modified name is inserted by the agent 300. The open object operation then continues to the operating system 202 using the modified name, thus leading to the object 123c within the isolation environment 350. Conversely, it is possible that the open operation will fail, because the desired object 123c does not exist within the isolation environment 350. Here, it is possible for the agent 300 to instead open the original named object, e.g. object 123a, where the permissions in the policy unit 330 are favourable, using the impersonation token mechanism discussed above in FIG. 5. This open operation thus now reaches the original object 123a, such as a system-wide object owned by the operating system 202, for example. Hence, by selectively opening objects using the original name, or the modified name, as appropriate, controlled by the agent 300, access is provided for the isolated process 120b either to the local object 123c having the modified object name, or, when expressly permitted, to the original named object 123a.

This virtualization, using modified names, is significant in ensuring that a particular application (e.g. Adobe Acrobat Reader) is isolated from other instances of the same application within the same user session (e.g. other instances of Adobe Acrobat Reader in another isolation environment or in the primary user's context). Notably, many applications use named objects to communicate with one another, or to restrict the number of instances of an application. Hence, controlling access to named objects allows the computer device 200 to function on a practical level, and achieve the functions desired by the user, while maintaining effective isolation.

Clipboard Isolation

Figure 7:
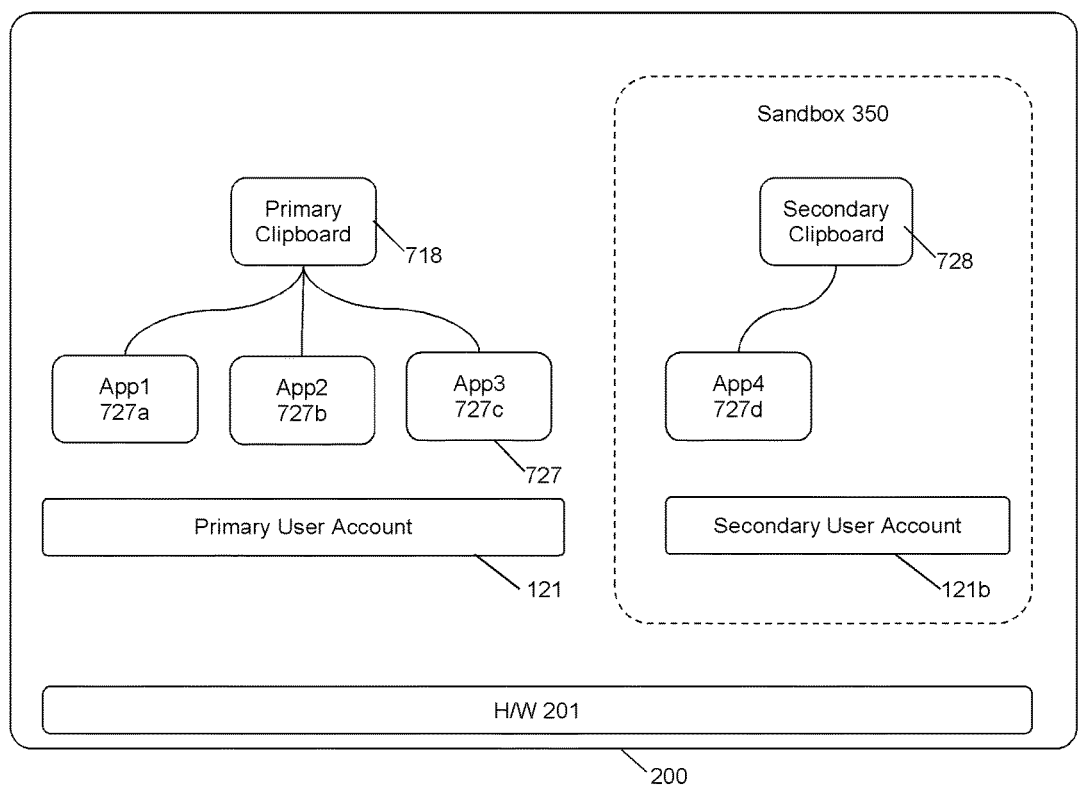
FIG. 7 is a further schematic view of the example computer device.

FIG. 7 is a further schematic view of the computer device 200. In this example the computer device is adapted in order to provide isolation for content on a clipboard. Thus, the computer device is better protected from malicious attacks related to the clipboard.

In this example, the computer device 200 includes at least one user application running under the primary user account 121, and here three applications 'App 1' 727a, 'App2' 727b, and 'App3' 727c are shown for illustration. Also, the computer device 200 includes at least one clipboard 718, which is conveniently referred to herein as the primary clipboard.

In this embodiment, the computer device 200 further includes at least one secondary user account 121b, which may have been created to implement the task isolation environment or sandbox 350 in the manner described herein. In this example, at least one isolated application 727d ('App 4') is provided, running in the secondary user account 121b. Here, each of the user applications 727a-727d may access the primary clipboard 718, e.g. via a clipboard API, to perform clipboard operations such as 'cut', 'copy', 'paste', etc., as will be familiar to those skilled in the art. Notably, by default, under the normal behaviour of most conventional operating systems, the isolated application 727d running in the sandbox user account 121b would be able to access the primary clipboard 718, which introduces a vulnerability or vector of attack.

In the example embodiments, at least one secondary clipboard 728 is provided, in the context of the secondary user account 121b. The secondary clipboard 728 is provided to be used from the context of the secondary user account 121b by the isolated application 727d. In one example, the computer device 200 is adapted such that the primary clipboard 718 and the secondary clipboard 728 are isolated from each other. In one example, each clipboard 718, 728 has a respective security context and is accessible only by applications which are provided in the same security context as that clipboard. In other examples as discussed below, certain forms of access are selectively permitted (or denied) across contexts, i.e. from the context of the primary user account 120 into the secondary clipboard 728, and from the context of the secondary user account 121b into the primary clipboard 718.

In one example mode of operation, the computer device 200 is configured to intercept a clipboard operation request originating from the secondary user account 121b, and to satisfy that request by using the secondary clipboard 728. Further, the computer device 200 may be configured to intercept each clipboard operation request, from each security context, and to selectively allow, deny or redirect the intercepted clipboard operation as appropriate. Thus, for example, a clipboard operation request originating from the primary user account 121, e.g. from the user application 727a, may be intercepted and then satisfied by using the primary clipboard 718. By contrast, a clipboard operation request originating from the isolated application 727d in the secondary user account 121b, may be intercepted and then satisfied by using the secondary clipboard 728.

Interestingly, the computer device 200 of the example embodiments still provides a satisfactory user experience in terms of cutting, copying and pasting clipboard content. At the same time, this clipboard mechanism maintains security and isolation of potentially malicious code by being able to confine potentially insecure clipboard operations to remain solely within a respective security context.

Figure 8:
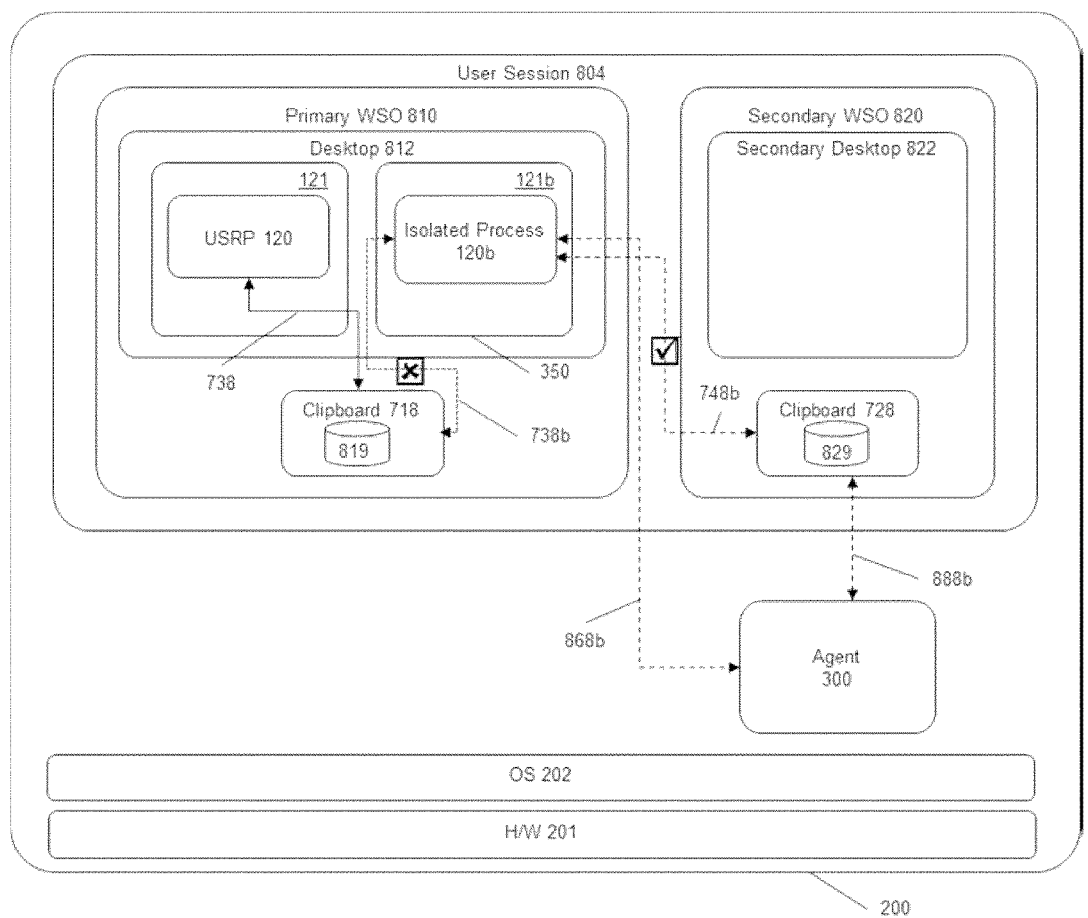
FIG. 8 is a further schematic view of the example computer device.

FIG. 8 is a further schematic view of the computer device 200 in more detail. In this example, the computer device 200 is configured to create the secondary clipboard 728 with additional security refinements which provide enhanced separation between the respective contexts, by leveraging the conventional operating system 202.

Typically, the operating system 202 provides a user session 804 comprising a primary window station object 810 and including a primary clipboard 718. By default, there is only one clipboard (i.e. the primary clipboard 718) which is accessible by all the processes running in the user session 804. Thus, the primary clipboard 718 is by default accessible by a regular user process 120 associated with native applications 727a-c, and also by an isolated process 120b associated with the isolated application 727d.

In one example, the primary window station object 810 may be created with security attributes (SA) derived according to a security identifier (SID) of the user and the SIDs of any other security groups to which the user belongs. Further, in the example embodiments, the computer device 200 is adapted to create primary clipboard 718 with corresponding security attributes. In this way, the computer device 200 may permit clipboard operations between an application 727a and the clipboard 718 wherein the same or compatible security attributes are exhibited, i.e. security attributes derived from the same SID. Conversely, the computer device 200 may deny clipboard operations where different or incompatible security attributes are involved, i.e. derived from different SIDs. That is, the operating system 202 may only permit certain processes (i.e. user process 120) having the same security context 121 as the primary clipboard 718 to access the primary clipboard 718.

For illustration, in one practical example the primary window station object 810 may be created by the computer device 200 running on a Microsoft Windows type operating system by calling:

HWINSTA hWS=CreateWindowStation(sWSName,0, nWSFlags,&sa)

where sWSName is a name of the window station object and sa is a SECURITY_ATTRIBUTES structure generated from the SID of the user and the SIDs of any other security groups to which the user belongs. The nWSFlags parameter specifies a type of access a returned handle provides to the window station object. In addition, authorization API calls may be used to generate the security attributes structure of the window station object from the SID of the user and the SIDs of any other security groups to which the user belongs, e.g. by calling GetTokenInformation and CopySid to obtain these SIDs using a token returned by LogonUser, and SetEntriesInAcl and SetSecurityDescriptorDacl to build the SECURITY_ATTRIBUTES structure after setting up the SID and access masks in EXPLICIT_ACCESS structure parameters.

Additionally, in this example, the computer device 200 further provides a secondary window station object 820, with security attributes derived according to the SIDs associated with the secondary user account 121b, rather than the SIDs associated with the primary user account 121. The secondary window station object 820 comprises the secondary clipboard 728, with corresponding security attributes. However, due to these differences between the security attributes of the primary window station object 810 as against those of the secondary window station object 820, the operating system 202 will now only permit certain processes (i.e. the isolated process 120b) having the same security context 121b as the secondary clipboard 728 to access the secondary clipboard 728.

In one example, the computer device 200 may be configured to dynamically create the additional window station objects 820 using the agent 300 discussed previously. Particularly, considering the components of the agent 300 discussed above, the controller 310 may suitably instruct the provisioner unit 340 to provision the secondary window station object 820, by applying the user credentials used to generate the secondary user account 121b. For example, the provisioner unit 340 may create the secondary window station 820 by specifying a name of the secondary window station 820 and the DACL to create the secondary window station 820.

Additionally, in one example, the agent 300 may also modify the security attributes of an existing window station (e.g. the primary window station 810). For example, the controller 310, with suitable access rights, may cause the security attributes of the primary window station 810 to be modified, so as to limit which processes may access the primary clipboard 718.

Further, in one example, the agent 300 may also change a current interactive window station object (e.g. from the primary window station 810 to the secondary window station 820 or vice versa). For example, the controller 310 may cause the current interactive window station object to be switched from the primary window station 810 to the secondary window station 820, so that the isolated process 120b may access the secondary clipboard 728 in the secondary window station 820.

Generally, an operation of the computer device 200 may be modified by intercepting function calls or messages or events related to the operation. For example, a response or functionality of the operating system 202 related to the primary clipboard 718 may be modified by intercepting function calls of the clipboard API or messages or events related to the primary clipboard 718. Particularly, Microsoft Windows provides a 'Detours' library to intercept (or hook) Win32 functions. In this way, a Detours hook may be used to intercept one or more of the clipboard API functions.

In one example, the agent 300 is configured at least to intercept a clipboard operation request originating from the isolated process 120b. For example, the task interceptor 320E discussed above may be configured to intercept the clipboard API calls from the isolated process 120b The agent 300 may be configured to deny the intercepted request, when it is determined that the request is directed towards the primary clipboard 718. For example, the agent 300 may be configured to check the policy rules via the policy unit 330 and, if denied, the agent 300 may deny the intercepted request. The agent 300 may be further configured to redirect the intercepted request instead toward the secondary clipboard 728. For example, the controller 310 may be configured to redirect the intercepted request to the secondary clipboard 728.

In more detail, the task interceptor 320E may intercept a clipboard operation request from the isolated process 120b, relating to the request for the primary clipboard 718, as at operation 868b. The task interceptor 320E communicates the intercepted request to the controller 310. The controller 310 checks with the policy unit 330 and in response to a 'denied' result, the controller 310 causes the current interactive window station object to be switched from the primary window station 810 to the secondary window station 820 and directs the intercepted request instead to the secondary clipboard 728, according to operation 888b.

In summary, by default the primary clipboard 718 has little or no security and is exposed to malicious code which is supposedly isolated in the secondary user account 121b. Applying the SID of the primary user account 120 to the primary clipboard 718 now isolates the primary clipboard 718 away from the isolated processed 120b. However, the isolated processes 120b would now not have access to any clipboard. Therefore, the secondary clipboard 728 is provisioned for use by the isolated processes 120b. Here, the secondary clipboard 728 is provided within the secondary window station object 820 whereas user interaction for the isolated processes 120b will take place under the desktop interface of the primary window station object 810. Thus, when the isolated process 120b requests a handle to a clipboard, the process will be asking effectively for a handle to the primary clipboard 718 and the call will fail by exhibiting an incompatible security context (incorrect SID). Therefore, the example mechanism performed by the agent 300 further intercepts the respective API call and switches focus to the secondary window station object 820. Now, the redirected call will allow the isolated process 120b to obtain a handle to the secondary clipboard 728. Further switching between the primary window station object 810 and the secondary window station object 820 is then subsequently performed by the agent 300 as appropriate to progress operation of the clipboard, because the user interaction and the secondary clipboard are in the different respective window station objects 810,820.

For completeness, FIG. 8 illustrates that the primary clipboard 718 is supported in use by a primary clipboard memory 819, i.e. physical memory within the hardware 201 to store the clipboard content and so on. Likewise, the secondary clipboard 728 is supported by appropriate physical memory 829.

Figure 9:
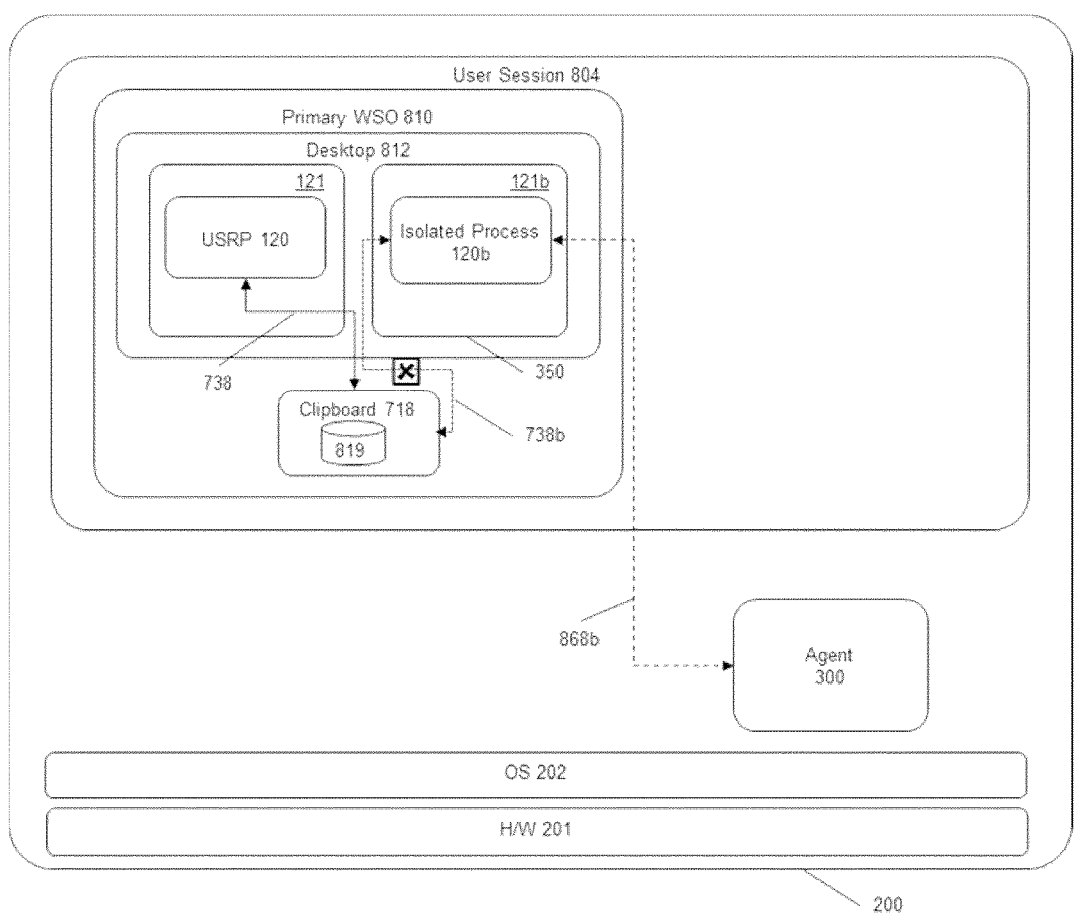
FIG. 9 is a further schematic view of the example computer device.
Figure 10:
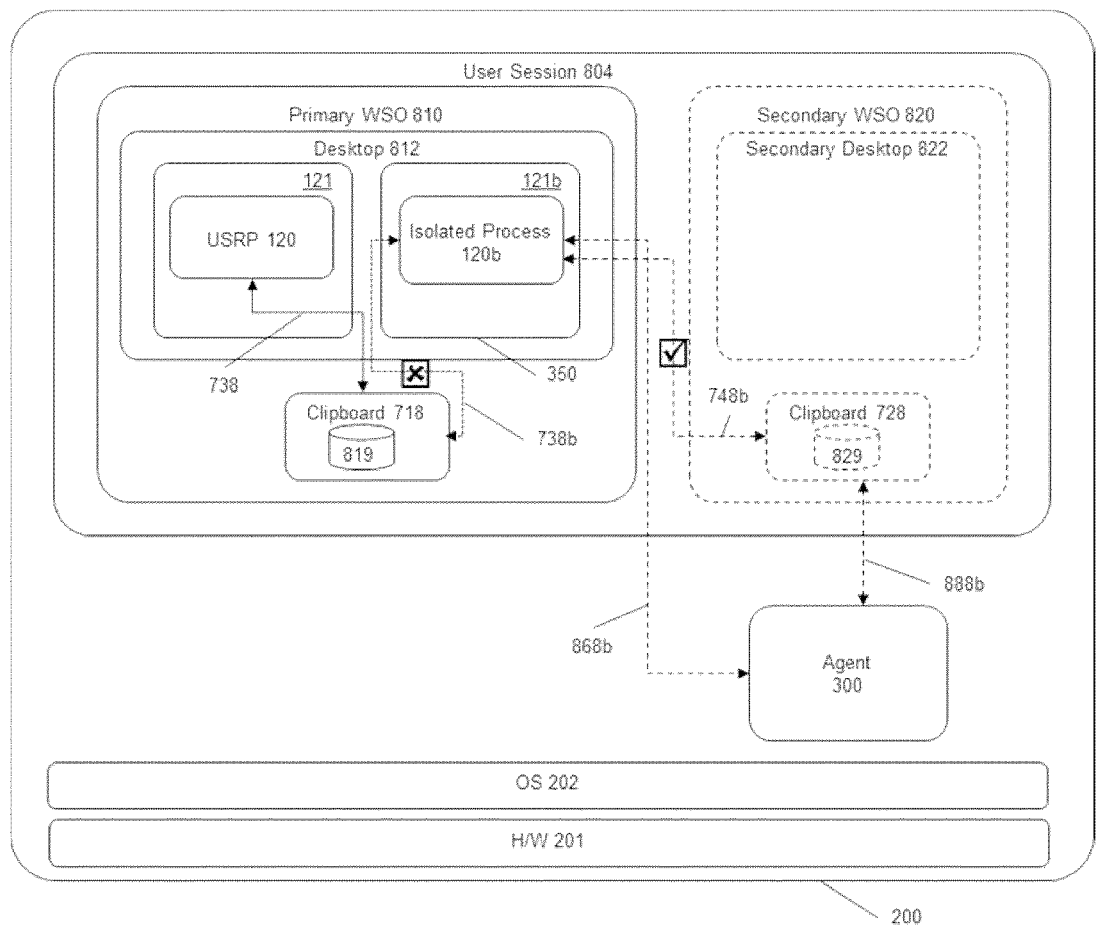
FIG. 10 is a further schematic view of the example computer device.

FIGS. 9 & 10 are further schematic views of the computer device in more detail. In this example, the agent 300 is configured to intercept the clipboard operation request originating from the secondary user account 121b and to satisfy the request by additionally provisioning, and subsequently using, the secondary clipboard 728.

In one example, the agent 300 may be configured to intercept the clipboard request from the isolated process 120b, as described above. In this example, the agent 300 may be further configured to newly provision the secondary clipboard 728 in response to the intercepted clipboard request so as to satisfy the intercepted clipboard request. Further, the agent 300 may be configured to determine whether or not to newly provision the secondary clipboard 728.

In more detail, within the agent 300 the task interceptor 320E intercepts an operation 738b from the isolated process 120b, relating to the request for the primary clipboard 718, as at operation 868b. The task interceptor 320E communicates the intercepted request to the controller 310. The controller 310 checks with the policy unit 330 and in response to the 'denied' result, the controller 310 determines whether the computer device 200 already comprises the secondary clipboard 728. If the controller 310 determines that the computer device 200 does not already comprise the secondary clipboard 728 (as illustrated in FIG. 9), the controller 310 instructs the provisioner unit 340 to newly provision the secondary clipboard 728 (as illustrated in FIG. 10). Particularly, the controller 310 may suitably instruct the provisioner unit 340 to newly provision the secondary window station object 820, so as to thereby newly provision in turn the secondary clipboard 728. The controller 310 then causes the current interactive window station object to be switched from the primary window station 810 to the secondary window station 820 and directs the intercepted request now toward the newly-created secondary clipboard 728, according to operation 888b. Hence, the secondary clipboard 728 is dynamically created by the computing device 200, under the control of the agent 300, to fulfil the clipboard request from the isolated process 120b.

In one example, the agent 300 may be configured to provision the secondary clipboard 728 in response to the intercepted clipboard request from the isolated process 120b, in which provisioning the secondary clipboard 728 comprises the agent 300 controlling the computing device 200 to create, manage and in turn destroy the secondary clipboard 728. For example, the agent 300 may be configured to control the computing device 200 to create the secondary clipboard 728 according to a first hooked clipboard request and may be further configured, for example, to control the computing device 200 to destroy the secondary clipboard 728 according to another hooked clipboard request or in response to a termination event (i.e. when the isolated process 120b or the secondary user account 121b or the task isolation environment 350 or the primary user account 121 is terminated or according to a persistence of the temporary user account 121b, as discussed previously). In this way, the agent 300 may control the secondary clipboard 728 as part of the task isolation environment 350, including determining when to create the secondary clipboard 728, when to use the clipboard 728 and when to destroy the clipboard 728 in response to relevant triggering events.

Figure 11:
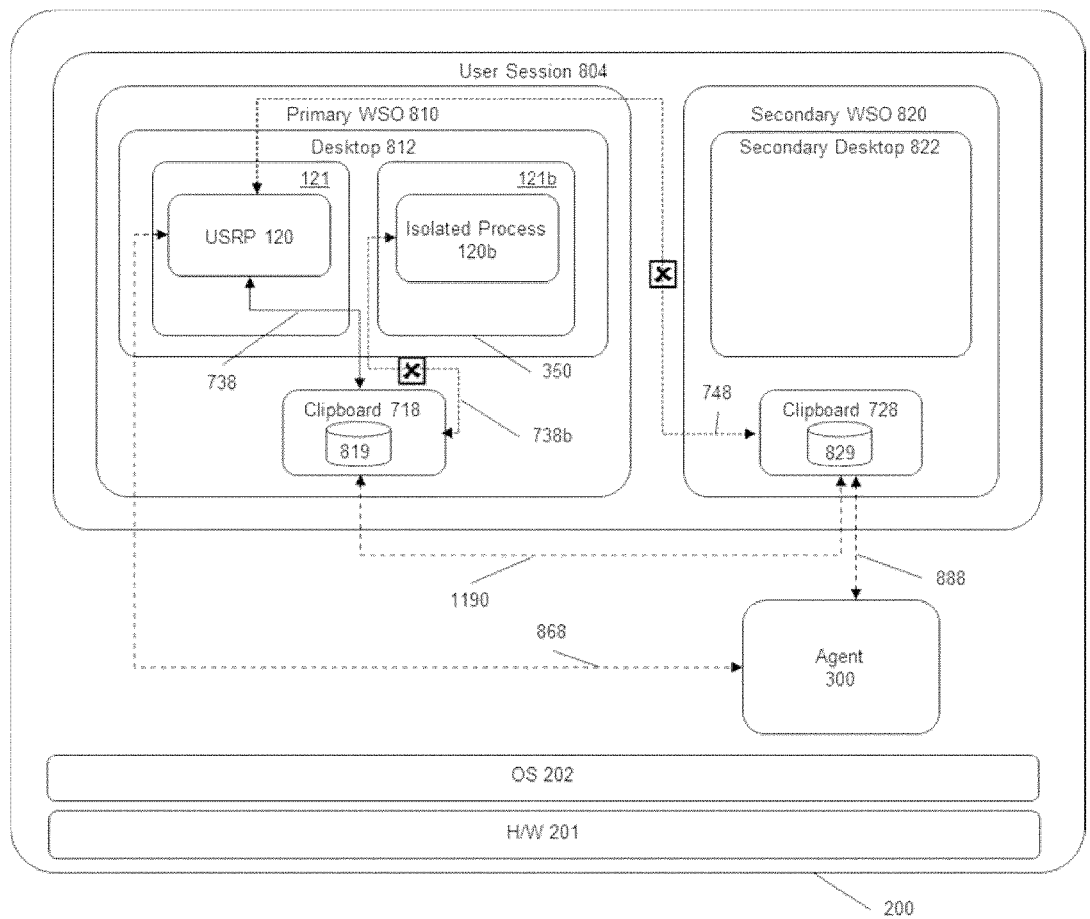
FIG. 11 is a further schematic view of the example computer device.

FIG. 11 is a further schematic view of the computer device 200 in more detail. In this example, the agent 300 is configured to selectively permit sharing of the clipboard content between the primary clipboard 718 and the secondary clipboard 728.

In the example embodiments, the security context 121 of the primary clipboard 718 is different from the security context 121b of the secondary clipboard 728. As a result, data may not, by default, be shared or exchanged between the primary clipboard 718 and the secondary clipboard 728, according to most conventional operating systems, the clipboard content of the primary clipboard 718 is isolated from the secondary clipboard 728. Conversely, the clipboard content of the secondary clipboard 728 is isolated from the primary clipboard 718.

In one example, the agent 300 is further configured to cause the clipboard content to be selectively shared between the primary clipboard 718 and the secondary clipboard 728. That is, the clipboard content of the primary clipboard 718 may be made accessible to the secondary clipboard 728. Conversely, the clipboard content of the secondary clipboard 728 may be made accessible to the primary clipboard 718. The agent 300 may be further configured to determine when to share the clipboard content e.g. the agent 300 may register be notified when the clipboard content of the primary clipboard 718 and/or secondary clipboard 728 changes and may be configured to share the clipboard content in response to such a notification.

In more detail, the agent 300 may cause certain items of clipboard content to be shared between the primary clipboard 718 and the secondary clipboard 728, according to an operation 1190. For example, the controller 310 may control the computer device 200 to copy an item of clipboard content from the primary clipboard 718 (i.e. from the memory 819) to the secondary clipboard 728 (i.e. to the memory 829). Conversely, the controller 310 may control the computer device 200 to copy content from the secondary clipboard 728 (i.e. from the memory 829) to the primary clipboard 718 (i.e. to memory the 819). In this way, the clipboard content may be shared between the primary clipboard 718 and the secondary clipboard 728, according to operation 1190, by selectively copying the clipboard content between the primary clipboard 718 and the secondary clipboard 728. Content from, for example, a potentially untrusted source in the task isolation environment 350 copied or cut into the secondary clipboard 728 may be pasted into the user process 120 using the primary clipboard 718, under the strict control of the agent 300. Further, the agent 300 may receive a notification that the clipboard content of the primary clipboard 718 and/or the secondary clipboard 728 has changed and may share the clipboard content in response to the notification. In this way, the clipboard content may be maintained consistently between the primary clipboard 718 and the secondary clipboard 728, such that the user is unaware of there being two separate clipboards in the background.

In one example, the agent 300 may be further configured to selectively permit or deny sharing of the clipboard content. This discretionary sharing may be permitted or denied according to predetermined policies. For example, sharing may be selectively permitted according to the security context of primary user account 121, or according to a type of the clipboard content. In one example, the controller 310 checks the policy unit 330 and as a result, selectively permits or denies sharing of the clipboard content, according to operation 1190.

In one example, the agent 300 may be further configured to modify the clipboard content prior to the content being shared to produce a modified version of the content, and then to share the modified clipboard content between the primary clipboard 718 and the secondary clipboard 728. In particular, the agent 300 may be configured to control the computer device 200 to modify a shared content, in which modifying shared content may comprise changing a format of the shared content from a first file format to a second file format (e.g. from a mark-up format to a simple text format), replacing one or more selected parts of the shared content (e.g. replacing hyperlinks with plain text web addresses), removing potentially-executable content from shared content (e.g. removing macros or script or code), stripping attachments (e.g. graphics) or determining and/or isolating potential attack vectors. For example, the controller 310 may control the computer device 200 to copy an item of clipboard content from the primary clipboard 718, modify the copied content and copy the modified content to the secondary clipboard 728 or vice versa. The controller may further check the policy unit 330 to determine how the copied content is to be modified.

Figure 12:
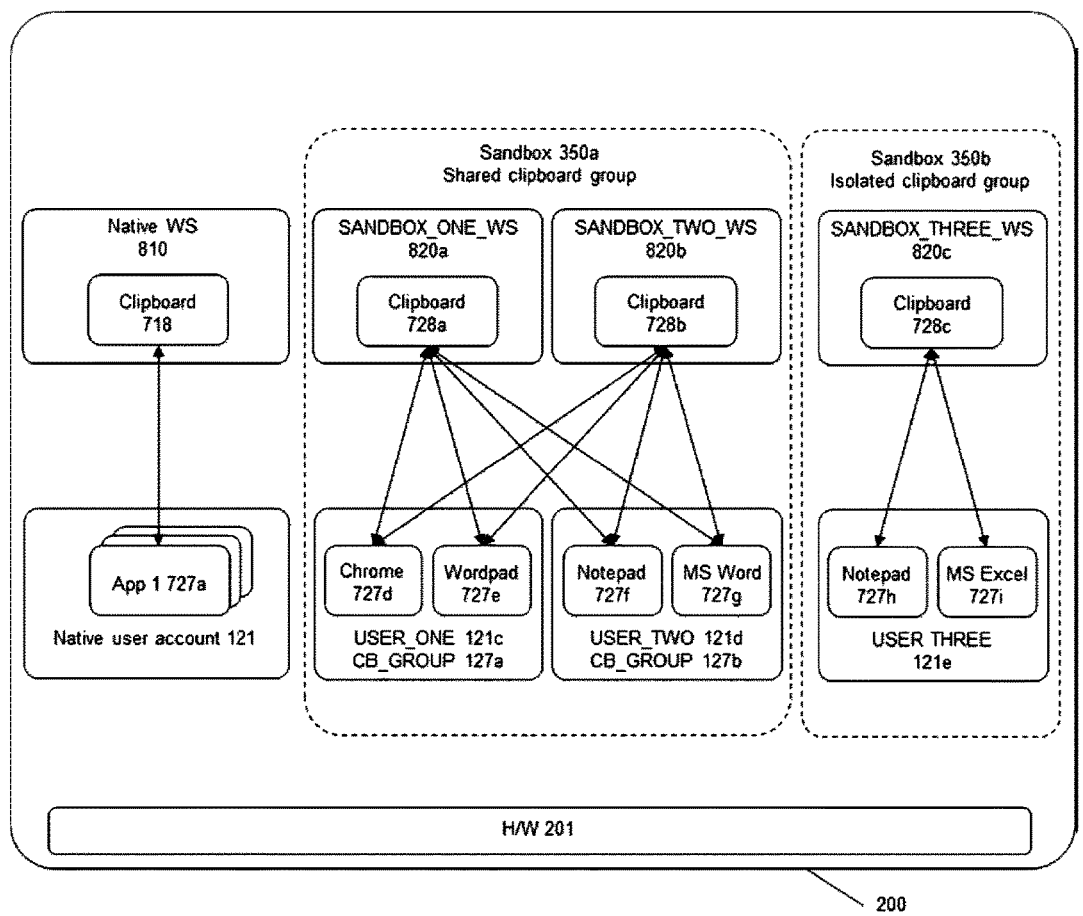
FIG. 12 is a further schematic view of the example computer device.

FIG. 12 is a further schematic view of the computer device 200 according to another example. In this example, the computer device 200 includes the virtual clipboard mechanism which is extended to comprise a plurality of clipboards selectively shared between a plurality of user accounts.

In this example, a plurality of secondary clipboards 728a, 728b & 728c are provisioned by computer device 200 and selectively shared by a plurality of secondary user accounts 121c, 121d & 121e. In this example, the primary clipboard 718 in a primary window station object 810 is provisioned by computer device 200 for the native account 121 and is accessible by an application 727a running in the native account 121. In addition, two shared clipboards 728a and 728b are provisioned by the computer device 200, in task isolation environment 350a, isolated from the native account 121, and accessible only by applications 727d/727e and 727f/727g running in the first and second secondary user accounts USER_ONE 121c & USER_TWO 121d, respectively. Conveniently, these clipboards 728a/728b have security contexts compatible with or derived from a group CB_GROUP 127a. Further, an isolated clipboard 728c in a second sandbox 350b is also provisioned by the computer device 200 for a third secondary user account USER_THREE 121e and accessible only by applications 727h and 727i running in this secondary user account USER_THREE 121e.

In more detail, the primary clipboard 718 may be accessed by the application 727a running in the native account 121 e.g. for cut, copy and paste operations. Applications 727d/727e running in the secondary user account USER_ONE 121c may access both of the secondary clipboards 728a and 728b, while being isolated from the primary clipboard 718. Similarly, applications 727f/727g running in secondary user account 121d may access both of these secondary clipboards 728a and 728b, while being isolated from the primary clipboard 718. Further, the isolated clipboard 728c is accessible by applications 727h and 727i, while this clipboard 728c is selectively isolated from each of other the user accounts (i.e. primary user account 121, secondary user account 121c and secondary user account 121d).

Hence, more than one secondary clipboard 728 may be created and controlled by the agent 300 as described previously, thus further isolating the clipboard content onto separate clipboards. For example, the agent 300 may create and control a plurality of secondary clipboards 728a-728c for a plurality of isolated processes. With this in mind, the virtual clipboard mechanism may provide a set of clipboards that may selectively extend across native and isolated user accounts, with the ability to selectively and precisely control the accessibility of each of those clipboards and the extent to which sharing is or is not permitted therebetween.

It will be appreciated by those skilled in the art that the virtual clipboard mechanism advantageously permits data transfer between applications running in the sandbox (i.e. running in the secondary user account 121b in the task isolation environment 350). Further, the virtual clipboard mechanism permits data transfer between any authorised applications running natively (i.e. running in the primary user account 121). Still further, the virtual clipboard mechanism may permit data transfer through clipboard operations from a native application to an isolated process but conversely may block data transfer from the sandboxed application returning toward the native application. In one example, virtual clipboard mechanism may also indicates to the user when no data are available to be pasted in a particular context, e.g. at the computer device 200 start-up.

While requests to access the clipboards have been described generally as initiating from applications (e.g. the native user application 727a or the isolated application 727*d*), it will be appreciated by those skilled in the art that these requests may originate from, for example, processes (e.g the user process 120 or the isolated process 120*b*), threads, programs or windows. Further, while requests to access the clipboards have been described generally as initiating from the user, it will be appreciated by those skilled in the art that these requests may originate programmatically even in the absence of any user interactions. The agent 300 may be configured to intercept one, some or all the clipboard access requests (e.g. by hooking clipboard API calls) and the agent 300 may isolate primary clipboard 718 from all potentially malicious code.

While the described examples provide a single clipboard owner regardless of a number of sandboxed clipboards, it will be appreciated by those skilled in the art that other examples may provide a separate clipboard owner for each group of communicating sandboxes in addition to a native clipboard owner.

Further, while the described examples stipulate what access by the sandboxed application 727*d* to the native clipboard 718 is allowed and what access by native application 727 to sandboxed clipboard 728 is allowed, it will be appreciated by those skilled in the art that other examples may provide additional and/or alternative rules on monitoring the clipboard content and granting and/or denying clipboard access. For example, additional rules may be applied to allow trusted clipboard content to be transferred across an isolation boundary between the trusted user application 727 and untrusted isolated application 727*d*. For example, copying and pasting of plain text between the native user application 727 and the untrusted sandboxed application 727*d* may be allowed. For example, these rules may be included in the policy database 335.

Figure 13:
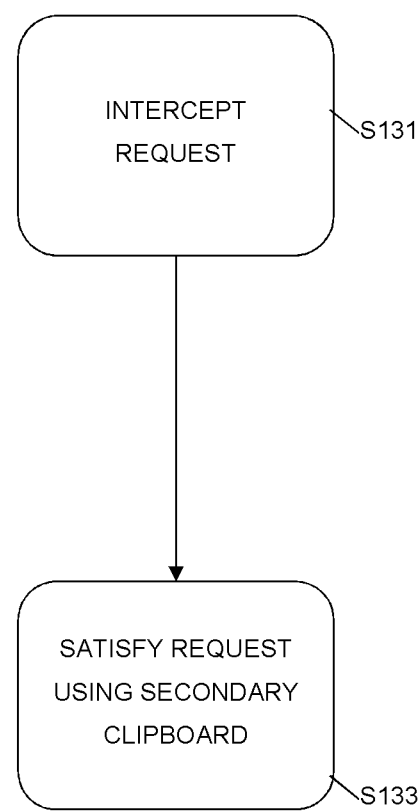
FIG. 13 is a schematic flowchart of an example method of operating the computer device.

FIG. 13 is a schematic flowchart of an example method. In this case, as described in more detail above, the method includes step S131 of intercepting the clipboard access request from the secondary user account prior to satisfying of the clipboard access request by the computer device, wherein the clipboard access request relates to an untrusted content. Step S133 includes satisfying the clipboard access request using the secondary clipboard accessible by the secondary user account in relation to the untrusted content. The step S133 may further include any of the steps discussed herein. In particular, the step 133 may include any of the steps discussed herein in relation to clipboard access request from the secondary user account.

Figure 14:
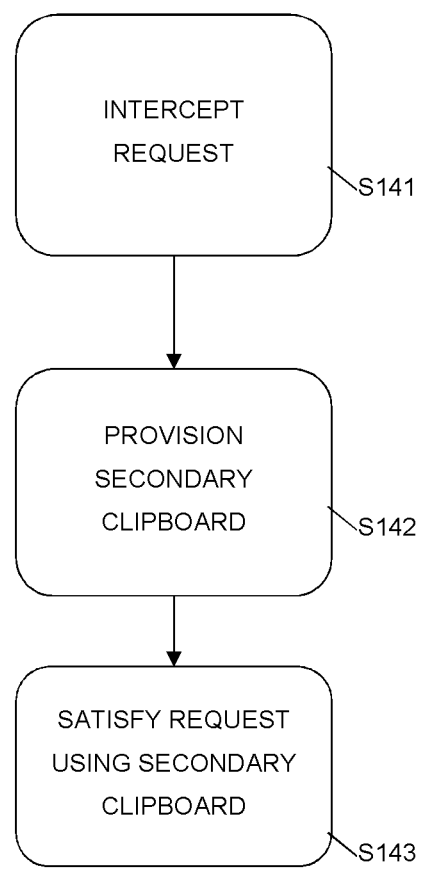
FIG. 14 is a schematic flowchart of another example method.

FIG. 14 is a schematic flowchart of an example method. In this case, as described in more detail above, the method includes step S141 of intercepting the clipboard access request from the secondary user account prior to satisfying of the clipboard access request by the computer device, wherein the clipboard access request relates to an untrusted content. Step S142 includes provisioning the secondary clipboard for satisfying of the clipboard access request, including provisioning the secondary clipboard by programmatically creating the secondary clipboard accessible from the secondary user account on the computer device. Step S143 includes satisfying the clipboard access request using the secondary clipboard accessible by the secondary user account in relation to the untrusted content. The step S142 may further include any of the steps discussed herein. In particular, the step 142 may include any of the steps discussed herein in relation to provisioning the secondary clipboard accessible from the secondary user account. The step S143 may further include any of the steps discussed herein. In particular, the step 143 may include any of the steps discussed herein in relation to clipboard access request from the secondary user account.

Figure 15:
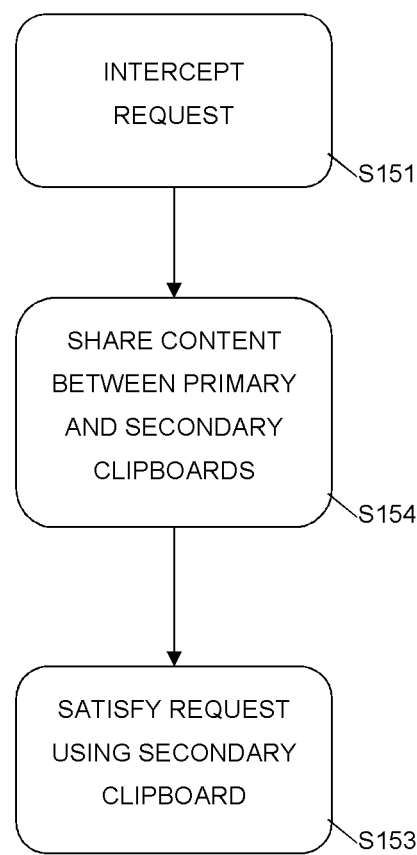
FIG. 15 is a schematic flowchart of another example method.

FIG. 15 is a schematic flowchart of an example method. In this case, as described in more detail above, the method includes step S151 of intercepting the clipboard access request from the secondary user account prior to satisfying of the clipboard access request by the computer device, wherein the clipboard access request relates to untrusted content. Step S152 includes sharing content between the primary clipboard not accessible from the secondary user account on the computer device and the secondary clipboard accessible from the secondary user account on the computer device. Step S153 includes satisfying the clipboard access request using the secondary clipboard accessible by the secondary user account in relation to the untrusted content. The step S152 may further include any of the steps discussed herein. In particular, the step 152 may include any of the steps discussed herein in relation to sharing the clipboard content between the primary user account and the secondary user account. The step S153 may further include any of the steps discussed herein. In particular, the step 153 may include any of the steps discussed herein in relation to the clipboard access request from the secondary user account.

Figure 16:
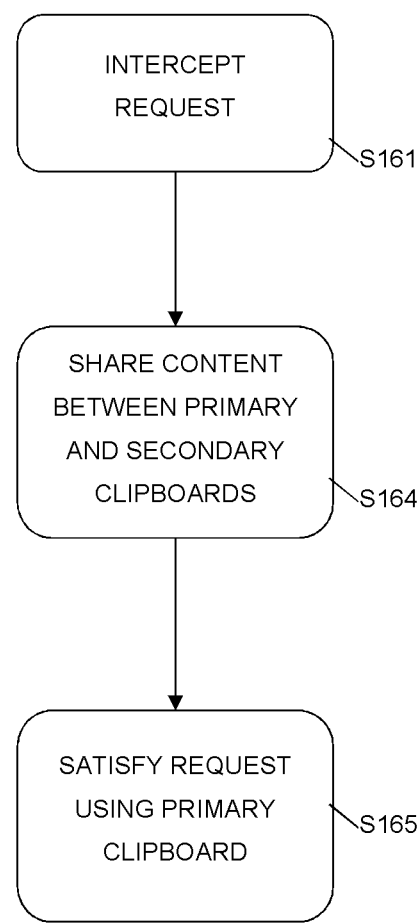
FIG. 16 is a schematic flowchart of another example method.

FIG. 16 is a schematic flowchart of an example method. In this case, as described in more detail above, the method includes step S161 of intercepting the clipboard access request from the user account prior to satisfying of the clipboard access request by the computer device, wherein the clipboard access request relates to an untrusted content. Step S162 includes sharing the clipboard content between the secondary clipboard not accessible from the user account on the computer device and the primary clipboard accessible from the user account on the computer device. Step S163 includes satisfying the clipboard access request using the primary clipboard accessible by the user account in relation to the untrusted content. The step S162 may further include any of the steps discussed herein. In particular, the step 162 may include any of the steps discussed herein in relation to sharing the content between the primary user account and the secondary user account. The step S163 may further include any of the steps discussed herein. In particular, the step 163 may include any of the steps discussed herein in relation to the clipboard access request from the primary user account.

In summary, the example embodiments have described an improved mechanism to isolate untrusted content in a computer device. The industrial application of the example embodiments will be clear from the discussion herein.

Advantageously, the example clipboard mechanism dependably and securely supports clipboard functionality, allowing the user to perform copy, cut and paste operations any number of times in any order, while switching security contexts between the secondary user account 121*b* and the primary user account 121 and vice-versa. That is, the virtual clipboard mechanism provides clipboard functionality as expected by the user while also isolating the primary clipboard 718 from potentially malicious code. The virtual clipboard mechanism transparently provides secure clipboard access for the user, since the user may use typical clipboard operations across one or more native applications and one or more isolated applications wherein the virtual clipboard mechanism appears to the user to be a single clipboard, albeit with certain limitations for security. In this way, the user is not inconvenienced by the functioning of the isolated clipboards and the security of the computing device 200 is not compromised by potential threats to the clipboards.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

What is claimed is:

1. A method for isolating untrusted content on a computer device, the method being implemented by hardware of the computer device including at least a processor and a memory, the method comprising:
   providing a primary clipboard accessible from a primary user account having a first security identifier belonging to a first security group, wherein the primary clipboard enables content to be temporarily stored therein and retrieved therefrom;
   creating programmatically a secondary user account derived from the primary user account having a second security identifier belonging to a second security group, wherein the secondary user account isolates an untrusted process;
   provisioning a secondary clipboard associated with the secondary user account having a second security identifier belonging to a second security group;
   intercepting a clipboard operation request from the secondary user account which is directed toward the primary clipboard; and
   satisfying the clipboard operation request using the secondary clipboard associated with the secondary user account such that the clipboard operation is executed within a security context of the second security group.

2. The method of claim 1, wherein provisioning the secondary clipboard comprises provisioning the secondary clipboard in response to intercepting the clipboard operation request.

3. The method of claim 1, wherein the method further comprises selectively determining to permit or deny the clipboard operation request from the secondary user account.

4. The method of claim 1, wherein the method further comprises sharing an item of clipboard content between the primary clipboard and the secondary clipboard.

5. The method of claim 4, wherein the method further comprises selectively determining to permit or deny sharing of the item of clipboard content between the primary clipboard and the secondary clipboard.

6. The method of claim 4, wherein the item of clipboard content is taken from the secondary clipboard, wherein the method further comprises modifying the item of clipboard content to create a modified clipboard content item, and providing the modified clipboard content item onto the primary clipboard.

7. The method of claim 6, wherein the method further comprises determining whether to modify content shared between the primary clipboard and the secondary clipboard associated with the secondary user account.

8. The method of claim 1, wherein provisioning the secondary clipboard comprises provisioning a secondary window station object comprising the secondary clipboard associated with the secondary user account.

9. The method of claim 1, wherein the method further comprises switching between a primary workstation object comprising the primary clipboard associated with the primary user account and the secondary window station object comprising the secondary clipboard associated with the secondary user account.

10. A computer device comprising a processor and a memory, wherein the computer device is configured to:
    provide a primary clipboard accessible from a primary user account having a first security identifier belonging to a first security group, wherein the primary clipboard enables content to be temporarily stored therein and retrieved therefrom;
    programmatically create a secondary user account, derived from the primary user account, having a second security identifier belonging to a second security group, wherein the secondary user account isolates an untrusted process;
    provision a secondary clipboard associated with the secondary user account having a second security identifier belonging to a second security group;
    intercept a clipboard operation request from the secondary user account for a cut, copy or paste type clipboard operation which is directed toward the primary clipboard; and
    satisfy the clipboard operation request using the secondary clipboard associated with the secondary user account such that the clipboard operation is executed within a security context of the second security group.

11. The computer device of claim 10, wherein the computer device is further configured to provision the secondary clipboard in response to intercepting the clipboard operation request.

12. The computer device of claim 10, wherein the computer device is further configured to selectively determine to permit or deny the clipboard operation request from the secondary user account.

13. The computer device of claim 10, wherein the computer device is further configured to share an item of clipboard content between the primary clipboard and the secondary clipboard.

14. The computer device of claim 13, wherein the computer device is further configured to selectively determine to permit or deny sharing of the item of clipboard content between the primary clipboard and the secondary clipboard.

15. The computer device of claim 13, wherein the item of clipboard content is taken from the secondary clipboard, wherein the computer device is further configured to modify the item of clipboard content to create a modified clipboard content item, and wherein the computer device is further configured to provide the modified clipboard content item onto the primary clipboard.

16. The computer device of claim 15, wherein the computer device is further configured to determine whether to modify content shared between the primary clipboard and the secondary clipboard associated with the secondary user account.

17. The computer device of claim 10, wherein the computer device further comprises an agent module, wherein the agent module is configured to:
provision the secondary clipboard associated with the secondary user account;
intercept the request from the secondary user account which is directed toward the primary clipboard; and
satisfy the request using the secondary clipboard.

18. The computer device of claim 17, wherein the agent module is further configured to:
provision a secondary window station object comprising the secondary clipboard associated with the secondary user account.

19. The computer device of claim 18, wherein the agent module is further configured to:
control the computer device to switch between a primary workstation object comprising the primary clipboard associated with the primary user account and the secondary window station object comprising the secondary clipboard associated with the secondary user account.

20. A non-transitory computer readable storage medium having recorded thereon instructions which, when implemented by a computer device, cause one or more of the computer device to perform the method of:
providing a primary clipboard accessible from a primary user account having a first security identifier belonging to a first security group, wherein the primary clipboard enables content to be temporarily stored therein and retrieved therefrom;
creating programmatically a secondary user account derived from the primary user account having a second security identifier belonging to a second security group, wherein the secondary user account isolates an untrusted process;
provisioning a secondary clipboard associated with the secondary user account having a second security identifier belonging to a second security group;
intercepting a clipboard operation request from the secondary user account which is directed toward the primary clipboard; and
satisfying the clipboard operation request using the secondary clipboard associated with the secondary user account such that the clipboard operation is executed within a security context of the second security group.

* * * * *